Patented Mar. 19, 1929.

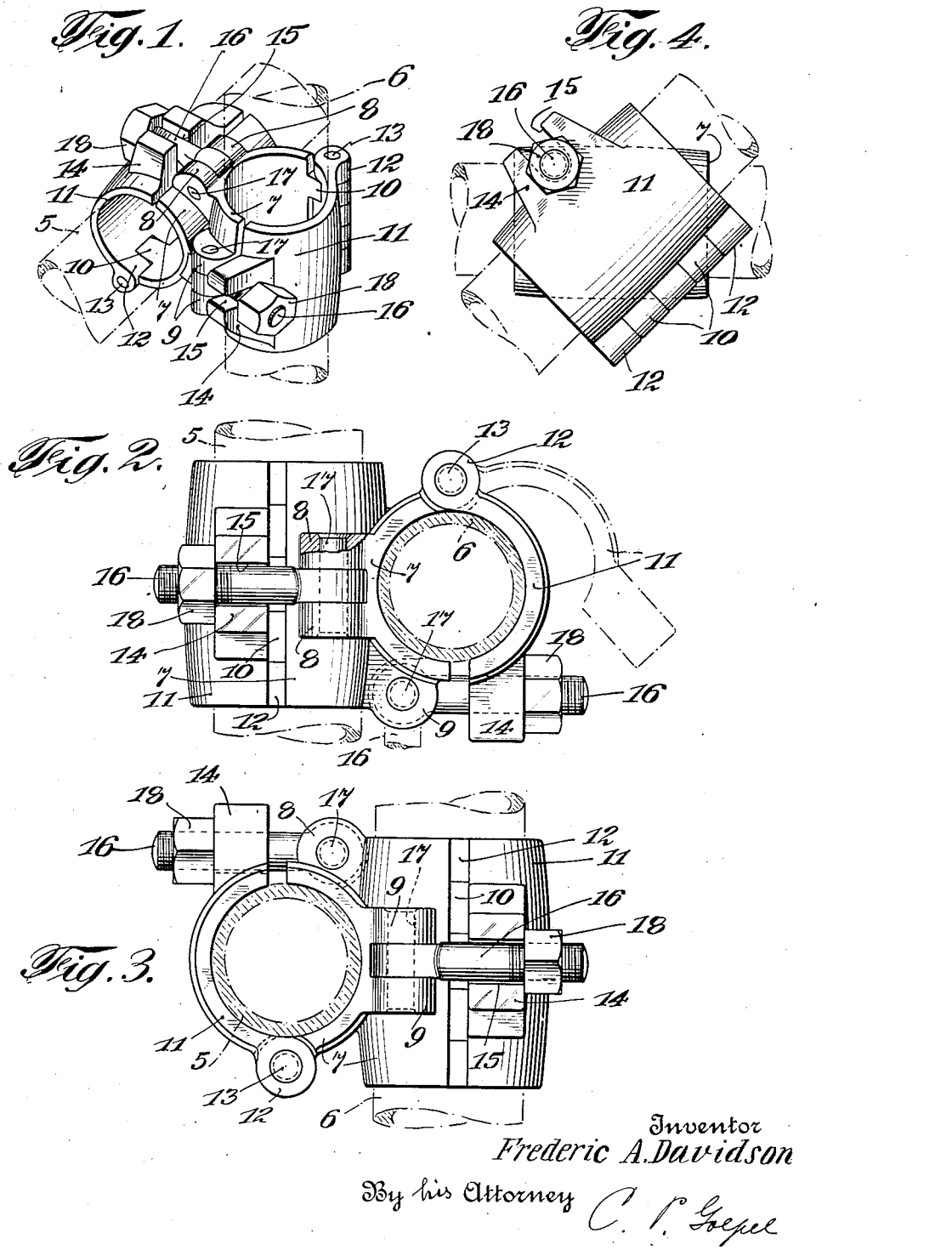

1,706,214

UNITED STATES PATENT OFFICE.

FREDERIC A. DAVIDSON, OF CHICAGO, ILLINOIS, ASSIGNOR TO AMERICAN SAFETY DEVICE COMPANY, OF NEW YORK, N. Y., A CORPORATION OF NEW YORK.

COUPLING MEANS.

Original application filed January 26, 1926, Serial No. 83,805. Divided and this application filed February 1, 1928. Serial No. 250,967.

My invention relates to coupling devices, and particularly to means for connecting elements that intersect. The invention is especially adapted for use with the members of a scaffold structure, or supporting framework of any kind.

An object of my improvements is to provide a simple coupling device with its principal parts permanently assembled, and no loose parts to be separated, and mislaid or lost.

A further object of my invention is to provide a coupling device which will be easy to put on, highly efficient and serviceable and of great durability and strength in practice.

My invention may be briefly described as consisting essentially of two clamps for engagement with the elements to be coupled, said clamps having adjacent connected sections to be located between said elements; and an adjustable section connected to each of the first named sections, together with securing means for the latter sections so as to tightly fasten the same upon said elements whereby the device is held rigidly in position.

The invention has other advantages and it consists in the features of the improved coupling device, and in the form, construction and relative arrangement of its several parts, as will be hereinafter more fully set forth, illustrated in the accompanying drawings and subsequently incorporated in the subjoined claims.

The drawings show several embodiments of the invention, and the same reference characters designate the same parts throughout the several views.—

Figure 1 is a perspective view showing one form of my improved coupling device as applied in use;

Fig. 2 is a plan view;

Fig. 3 is a side elevation; and

Fig. 4 is an elevation of a form of coupling wherein the axes of the two coupling sleeves are positioned in different angular relation to each other.

This case is a division of my application Ser. No. 83,805, for patent on coupling devices, filed Jan. 26, 1926.

Numerals 5 and 6 on Figs. 1, 2 and 3, designate two supporting elements which are tubular or cylindrical for a scaffold or other structure, and which are to be connected and rigidly held in fixed angular relation to each other by means of the coupling device according to my present invention.

This device consists of two clamps engageable with the supporting elements, each of said clamps including a substantially semi-cylindrical section 7. These sections 7 are positioned with their longer axes extending at right angles to each other, and with the outer convex sides of said sections integrally connected, so that these two sections are in the form of a single piece. One end of each section 7 is also integrally connected with the outside of the other section 7 intermediate of its ends by a pair of spaced ears or webs, 8 and 9 respectively, while similar ears, webs, or lugs 10 are formed upon one longitudinal edge of each of the sections 7.

The clamps also include each a movable section 11 complementary in form or shape to the sections 7 and provided upon one of its edges with ears or lugs 12 adapted to be assembled with the spaced ears or lugs 10 on the sections 7. These ears 10 and 12 are apertured to receive the pivot pin 13, whereby the section 11 of each clamp is pivotally connected along one of its edges with the section 7 for swinging movement relative thereto. Upon the opposite longitudinal edge of the pivoted section 11 a laterally projecting lug 14 is formed, said lug being slotted or bifurcated as at 15 for the reception of a bolt 16 having one of its ends positioned between the spaced ears 8 or 9 as the case may be, and loosely engaged for swinging movement upon the pivot pin 17 fixed in said ears. Each of the bolts 16 is threaded to receive a suitable clamping nut 18, which is adapted to engage against the outer side of the lug 14 on the adjacent clamping section 11 to urge the latter and the opposed section 7 of the clamp into tight clamping engagement upon the opposite sides of one of the supporting elements 5 or 6.

It will be apparent that a coupling device of the above description may be very easily and quickly applied and adjusted so as to rigidly connect or couple the members 5 and 6 positioned at an angle to each other, and positively hold the same against relative movement. Thus, it is only necessary, when the two elements 5 and 6 are set, to engage the sections 7 of the two clamps which are open, with the opposed sides of said elements at the point of intersection. The pivoted clamp sections 11 are then swung to closed position against the opposite sides of said elements, the bolts 16 swung inwardly into the slots 15 in the lugs 14 and the nuts 18 finally adjusted by means of a suitable wrench so as to cause the two sections of each clamp to exert the desired tight frictional binding pressure upon the supporting elements. When the nuts 18 are tightened, the strain is taken up directly by the webs 8 and 9 and distributed to the inner parts of the opposite sleeves, the webs 8 and 9 also bracing and holding to shape the inner parts of the sleeves. Further, the webs 8 and 9 lend rigidity and strength to the sleeves for holding them in their angular relation to one another. It will be noted that when the device is applied, all of the parts thereof are in assembled relation, and it is not necessary to carry a large number of separate parts to be successively assembled as the device is applied. Therefore, the necessary adjustments may be very easily and quickly made, and the time consumed in the operation of securely and effectively coupling the two supporting elements 5 and 6 with each other is thereby reduced to a minimum.

In some cases, the supporting elements 5 and 6 may not extend in planes at right angles to each other but may be positioned at various angles either greater or less than 90°.

As illustrated in Fig. 4 of the drawings, the same integral construction may be employed with the axes of the coupling sleeves positioned at any other desired angle with relation to each other, as for instance, at an angle of 45° as shown in this figure.

The clamps may of course be shaped to connect elements that are other than cylindrical in shape.

I claim:

1. A device for rigidly coupling two crossed elements together, comprising a pair of sleeves one for embracing each element, each sleeve comprising an inner part and an outer part hinged at one side to the inner part, each outer part having a pair of substantially radially extending lugs on its free end, the inner parts of the two sleeves being integral and disposed crosswise at an angle relative to each other, the integral inner parts having spaced webs in the angles between the inner parts and in registry with said radially extending lugs, and bolts hinged between the spaced webs adapted to engage between the respective pairs of lugs and having nuts on their free ends for binding engagement against the lugs and drawing the hinged outer parts of the sleeves against the respective elements directly from the interbracing webs between said inner parts.

2. A device for rigidly coupling two crossed elements together, comprising a pair of split sleeves one for each element, the inner sides of the sleeves being integral and disposed crosswise at an angle relative to each other and having a web at one end of each inner side in the angle adjacent the split of each sleeve, the outer side of each sleeve having a lug at the split, and clamping members between the lugs and the webs for contracting the sleeves on the elements and taking up the strain from the webs and the inner opposite sides of the sleeves between which the webs are located.

In testimony that I claim the foregoing as my invention, I have signed my name hereto.

F. A. DAVIDSON.